May 27, 1930.   H. T. WOOLSON   1,760,619
CLUTCH PLATE CONNECTION
Filed April 12, 1926
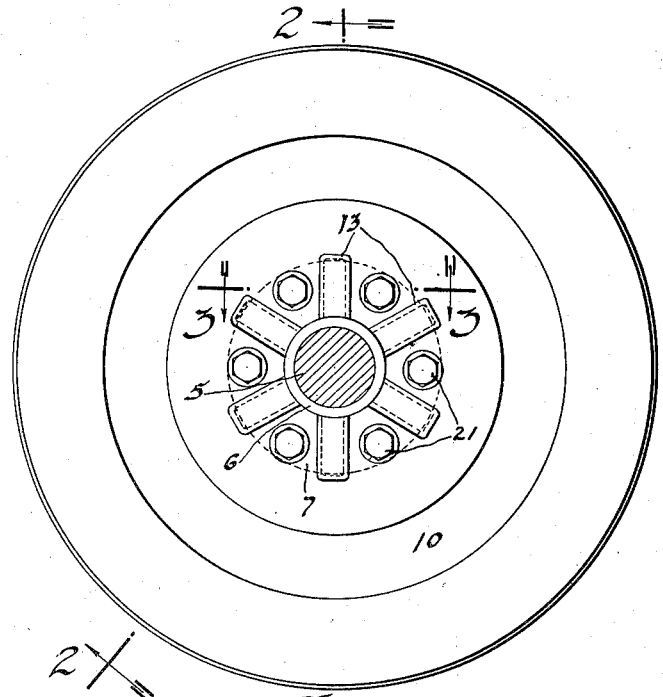
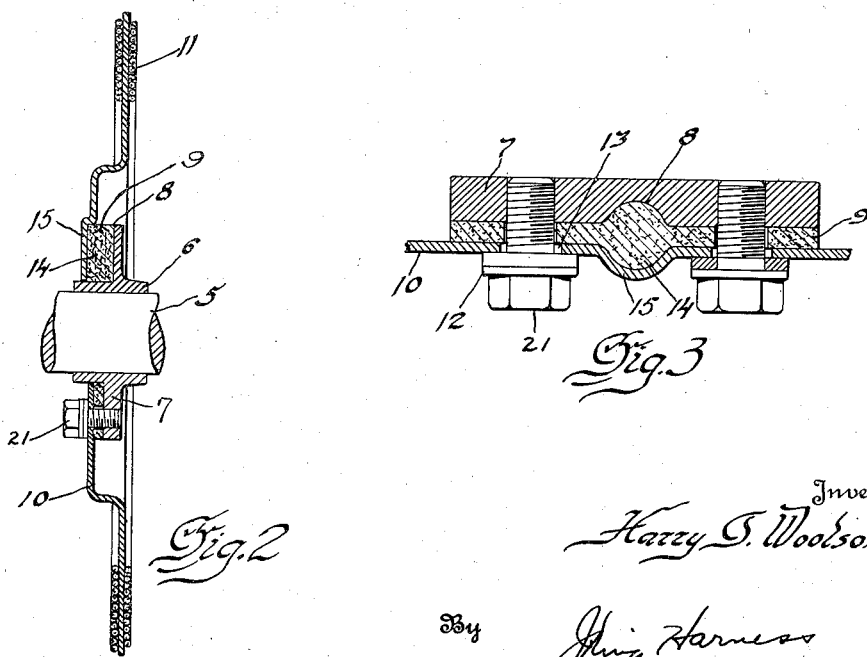

Patented May 27, 1930

1,760,619

UNITED STATES PATENT OFFICE

HARRY T. WOOLSON, OF DETROIT, MICHIGAN, ASSIGNOR TO CHRYSLER CORPORATION, OF HIGHLAND PARK, MICHIGAN, A CORPORATION OF DELAWARE

CLUTCH-PLATE CONNECTION

Application filed April 12, 1926. Serial No. 101,335.

It is the primary object of my invention to provide a connection between a driven shaft and a clutch plate adapted to absorb vibration transmitted from a driving member.

Other and further objects will appear as the specification progresses.

My invention therefore consists in the arrangement, combination and construction of the various parts of my improved device, as described in the specification, claimed in my claim and shown in the accompanying drawing, in which:

Fig. 1 is an elevation of a clutch plate mounted according to my invention.

Fig. 2 is a sectional view taken on line 2—2 of Fig. 1.

Fig. 3 is a sectional view taken on line 3—3 of Fig. 1.

I have shown a shaft 5 such as the conventional driven shaft of a motor vehicle having fixed thereon a sleeve 6. The sleeve 6 is provided with an upwardly extending flange 7 having spaced cut out portions 8 therein. A rubber disk 9 is positioned against the flange 7 and a clutch plate 10 having a conventional facing 11 is positioned against the rubber disk 9.

The flange 7, disk 9 and plate 10 are secured together by a plurality of studs 21 which extend through openings in the clutch plate 10 and disk 9 and are threaded into openings in the flange 7. Lock washers 12 are provided under the heads of the studs 21 for locking them in place and the apertures 13 in the clutch plate through which the studs extend are of larger diameter than the shanks of the studs so as to not contact therewith.

The clutch plate 10 is provided with a plurality of separated punched out portions 15 which align with the recesses 8 in the flange 7 and the rubber disk 9 is provided with a plurality of enlarged portions or ribs 14 which fit in the spaces formed by the cut out portions 8 and punched out portions 15.

It will be apparent that the rubber disk 9 acts as an insulator to absorb vibrations preventing their passing through the driving member to the driven member clutch plate, and that the enlarged portions 14 of the disk prevent slippage of the disk between the clutch plate and flange, both in normal operation and in event of dislocation or breakage of a stud.

It will be obvious that various changes may be made in the arrangement, combination and construction of the various parts of my improved device without departing from the spirit of my invention and it is my intention to cover by my claim such changes as may be reasonably included within the scope thereof.

What I claim is:

In combination, a shaft having a flanged sleeve thereon, a clutch plate secured to said flange, and a rubber member clamped between said flange and plate, said rubber member having a radially extending rib thereon and said plate and flange having corresponding indentations to receive the rib.

HARRY T. WOOLSON.